(12) United States Patent
Ichinose

(10) Patent No.: US 10,872,184 B2
(45) Date of Patent: Dec. 22, 2020

(54) SEWING ANALYSIS SYSTEM AND PROGRAM

(71) Applicant: JSOL Corporation, Tokyo (JP)

(72) Inventor: Noriyo Ichinose, Nagoya (JP)

(73) Assignee: JSOL CORPORATION, Tokyo (JP)

( * ) Notice: Subject to any disclaimer, the term of this patent is extended or adjusted under 35 U.S.C. 154(b) by 0 days.

(21) Appl. No.: 16/489,842

(22) PCT Filed: Feb. 28, 2018

(86) PCT No.: PCT/JP2018/007406
§ 371 (c)(1),
(2) Date: Aug. 29, 2019

(87) PCT Pub. No.: WO2018/168454
PCT Pub. Date: Sep. 20, 2018

(65) Prior Publication Data
US 2020/0226307 A1  Jul. 16, 2020

(30) Foreign Application Priority Data
Mar. 16, 2017 (JP) ................................. 2017-051461

(51) Int. Cl.
*G06F 30/23* (2020.01)
*G06T 17/00* (2006.01)

(52) U.S. Cl.
CPC ............. *G06F 30/23* (2020.01); *G06T 17/00* (2013.01); *G06T 2210/16* (2013.01)

(58) Field of Classification Search
CPC ...... G06F 30/23; G06T 17/00; G06T 2210/16
See application file for complete search history.

(56) References Cited

U.S. PATENT DOCUMENTS

| | | | |
|---|---|---|---|
| 2005/0171628 A1* | 8/2005 | Suzuki | D05B 19/08 700/138 |
| 2007/0032892 A1* | 2/2007 | Taguchi | D05B 11/00 700/83 |

(Continued)

FOREIGN PATENT DOCUMENTS

| | | |
|---|---|---|
| JP | H10-124538 A | 5/1998 |
| JP | 2000-003383 A | 1/2000 |

(Continued)

OTHER PUBLICATIONS

International Search Report PCT/ISA/210 for International Application No. PCT/JP2018/007406 dated Feb. 28, 2018 (with English Translation).

*Primary Examiner* — Sarah Lhymn
(74) *Attorney, Agent, or Firm* — Harness, Dickey & Pierce, P.L.C.

(57) ABSTRACT

A sewing analysis system includes: a sewing instruction unit, providing an instruction on an alignment position of a stitching line, seam allowance widths, and a stitching pitch; a cloth mesh creation unit, creating cloth meshes; a temporary stitching line creation unit, creating a temporary stitching line; a beam element creation unit, creating a beam element on the temporary stitching line; a spring element connection unit, connecting the beam elements of first paper pattern outer shape data and second paper pattern outer shape data by spring elements; a spring element connection unit, connecting the beam elements and the cloth meshes; and a seam allowance folding setting unit, folding seam allowances by applying loads in opposite directions respectively to the stitching lines and to peripheral edges on sides of the stitching lines of the first paper pattern outer shape data and second paper pattern outer shape data.

6 Claims, 9 Drawing Sheets

(56) References Cited

U.S. PATENT DOCUMENTS

| | | | |
|---|---|---|---|
| 2010/0305909 | A1 | 12/2010 | Wolper et al. |
| 2012/0222602 | A1* | 9/2012 | Hishida .................. D05B 23/00 |
| | | | 112/470.05 |
| 2014/0358495 | A1 | 12/2014 | Belmans et al. |
| 2015/0218743 | A1* | 8/2015 | Gardner .................. D05B 11/00 |
| | | | 112/475.19 |
| 2017/0046769 | A1* | 2/2017 | Jackson ............. G06Q 30/0631 |
| 2018/0020756 | A1* | 1/2018 | Nouais .................... G06F 30/20 |
| | | | 700/135 |
| 2018/0240280 | A1* | 8/2018 | Chen ....................... G06T 19/20 |

FOREIGN PATENT DOCUMENTS

| | | |
|---|---|---|
| JP | 2002-099582 A | 4/2002 |
| JP | 2003-067444 A | 3/2003 |
| JP | 2014-235748 A | 12/2014 |

\* cited by examiner

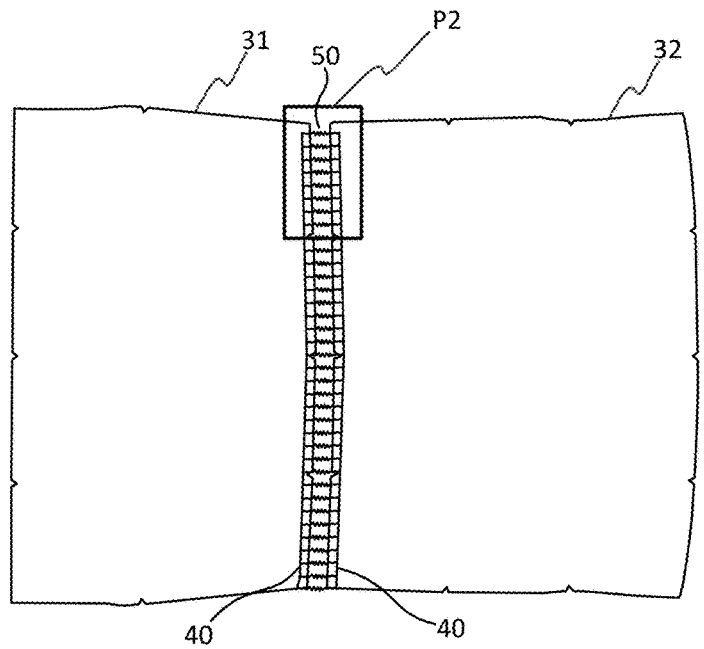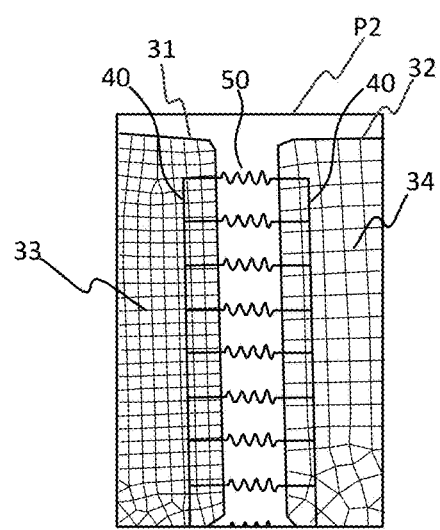
FIG. 9A  FIG. 9B
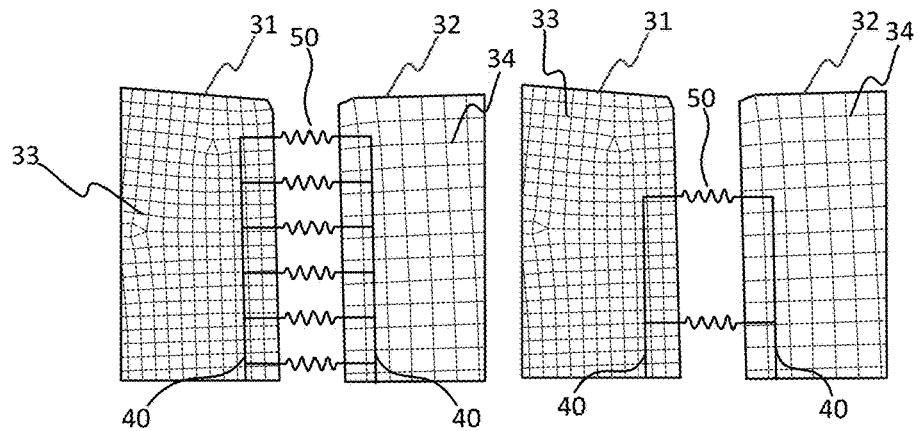
FIG. 10A  FIG. 10B

SEWING ANALYSIS SYSTEM AND PROGRAM

CROSS-REFERENCE TO RELATED APPLICATION

This is a continuation application of International Application No. PCT/JP2018/007406, with an International filing date of Feb. 28, 2018, which claims priority of Japanese Patent Application No. 2017-051461 filed on Mar. 16, 2017, the entire content of which is hereby incorporated by reference.

TECHNICAL FIELD

The present invention relates to a sewing analysis system and a program.

BACKGROUND ART

For a product such as a vehicle seat trim which uses a textile or leather (hereinafter, referred to as cloth), a flat paper pattern shape is designed from a specified three-dimensional design shape (hereinafter, referred to as a design shape). The design of the flat paper pattern shape is made based on the experiences of skilled engineers in many cases under present circumstances and is expected to be utilized in simulation from a viewpoint of quantitative design.

For an examination of the validity of the flat paper pattern shape, simulation in which a sewing process thereof is simulated (hereinafter, referred to as a sewing simulation) is required. Validity examination items include: the reproductivity of a design shape by sewing; the presence or absence of the occurrence of wrinkles during sewing; identification of the cause of occurrence of wrinkles at its occurrence time; and an influence of variations during manual sewing upon the design shape.

Items required for the sewing simulation for the validity examination include: forming of an appropriate model of cloth in consideration of nonlinear material characteristics; forming an appropriate model of a sewing portion; and forming of an appropriate model of a sewing process.

For example, in a conventional sewing simulation method such as in Patent Literature 1, based on the shape data of a paper pattern for clothing, the paper pattern is divided into very small polygonal elements and information for joining paper patterns with each another by combining the lines or points of the very small elements is given. Next, in order to make the paper pattern three dimensional, a designation line is set at a position where three dimensionalization is desired, the paper pattern is once cut off to be divided on the designation line, each of the divided paper patterns is deformed within a flat surface and then, reconnection is made.

SUMMARY OF INVENTION

However, in a sewing simulation in Patent Literature 1, a seam allowance is not taken into consideration and therefore, a change in stiffness of cloth around a stitching line due to the folding of the seam allowance cannot be represented and wrinkles cannot be appropriately represented. In addition, the stitching pitch depends on the number of divisions into very small elements and therefore, the stitching pitch cannot be changed while the accuracy of cloth analysis is maintained.

The present invention has been made so as to solve the above-described problems, and it is an object of the present invention to provide a sewing analysis system and a program that enable representation of a change in stiffness of cloth around a stitching line due to the folding of a seam allowance and enable change of a stitching pitch while the accuracy of cloth analysis is maintained.

To solve the above-described problem, a first aspect of the sewing analysis system of the present disclosure is a sewing analysis system for performing a simulation of a sewing process based on a flat paper pattern outer shape, which comprises: a sewing instruction unit for providing an instruction on an alignment position of first cloth and second cloth, seam allowance widths, and a stitching pitch based on paper patter outer shape data; a cloth mesh creation unit for creating a cloth mesh on each of the first cloth and the second cloth based on the paper pattern outer shape data; a temporary stitching line creation unit for creating a temporary stitching line on each of the first cloth and the second cloth based on the paper pattern outer shape data and the seam allowance widths; a beam element creation unit for creating a beam element forming a stitching line on the temporary stitching line based on the stitching pitch; a spring element connection unit for connecting the beam element of the first cloth and the beam element of the second cloth by spring elements; a beam element connection unit for connecting the beam elements and the cloth meshes; and a seam allowance folding setting unit for folding seam allowances by applying loads in opposite directions respectively to the stitching lines and to peripheral edges on sides of the stitching lines of the first cloth and the second cloth.

In this specification, "cloth" is a concept including fabric, leather, or synthetic resin, etc. that is used as a material of a three-dimensional structure.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 9A is a view for explaining connection by spring elements;

FIG. 9B is an enlarged view of a part of FIG. 9A.

FIG. 10A and FIG. 10B are views showing connection by spring elements in cases where different stitching pitches are specified.

DESCRIPTION OF EMBODIMENTS

Figure 1:
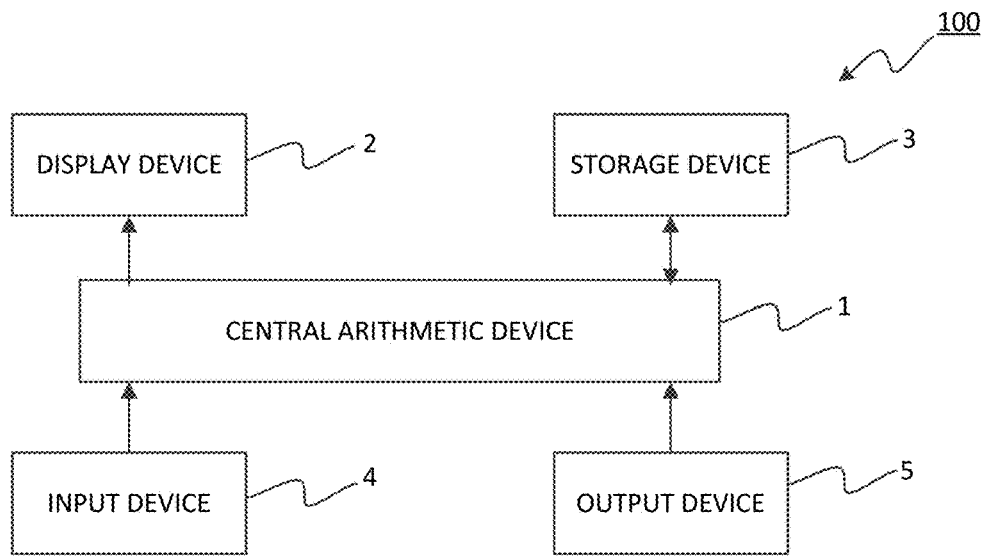
FIG. 1 is a view showing a schematic configuration of a sewing analysis system of one embodiment according to the present invention.

The following will describe a sewing analysis system according to one embodiment of the present invention in detail with reference to drawings. FIG. 1 is a view showing a schematic configuration of a sewing analysis system 100 according to this embodiment. As shown in FIG. 1, the sewing analysis system 100 of this embodiment includes a central arithmetic device 1, a display device 2, a storage device 3, an input device 4, and an output device 5.

The central arithmetic device 1 is a device, such as a personal computer, capable of executing programs and includes a CPU and a memory. The display device 2 is a device, such as a liquid crystal display, capable of displaying characters and images. The storage device 3 is a device, such as an HDD (Hard Disk Drive), capable of storing program and data; alternatively, an external database server or the like may be used. The program of the present invention is stored in the storage device 3. The input device 4 is a device, such as a keyboard, allowing a user to input data or instructions. The output device 5 is a device, such as a printer, capable of outputting characters and images. In the sewing analysis system 100 of this embodiment, the output device 5 can be omitted.

Figure 2:
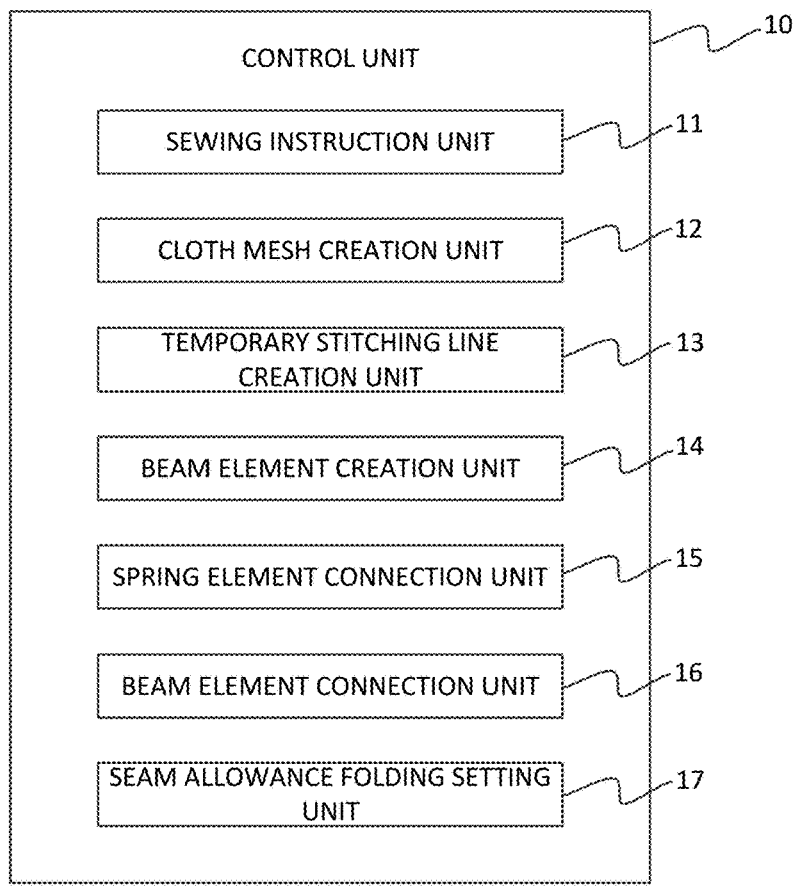
FIG. 2 is a view showing a function block of the sewing analysis system.

FIG. 2 is a view showing a function block that functions by the execution of the program of the present invention by the central arithmetic device 1. As shown in FIG. 2, the central arithmetic device 1 functions as a control unit 10. In addition, the control unit 10 functions, according to the program of the present invention, as: a sewing instruction unit 11, a cloth mesh creation unit 12, a temporary stitching line creation unit 13, a beam element creation unit 14, a spring element connection unit 15, a beam element connection unit 16, and a seam allowance folding setting unit 17.

The sewing instruction unit 11 provides an instruction on an alignment position of first cloth and second cloth, seam allowance widths, and a stitching pitch based on paper pattern outer shape data. Here, the first cloth and the second cloth indicate two cloth pieces which are paired for sewing, and do not indicate that the number of cloth pieces are only two. In addition, the paper pattern outer shape data is, for example, created through a process different from that for processing by the sewing analysis system 100 which is described in this embodiment.

The cloth mesh creation unit 12 creates a cloth mesh on each of the first cloth and the second cloth based on the paper pattern outer shape data.

The temporary stitching line creation unit 13 creates a temporary stitching line on each of the first cloth and the second cloth based on the paper pattern outer shape data and the seam allowance widths. The temporary stitching line is a temporary stitching line that is exclusively used for position alignment of the first cloth and the second cloth; and has a different concept from that for a stitching line formed by a beam element.

The beam element creation unit 14 creates a beam element on the temporary stitching line based on the stitching pitch. The beam element forms a stitching line.

The spring element connection unit 15 connects the beam element of the first cloth and the beam element of the second cloth by spring elements. By using the spring elements, a model of a sewing part of the first cloth and the second cloth can be formed.

The beam element connection unit 16 connects the beam elements and the cloth meshes. In this embodiment, the beam elements are created independently of nodes of the cloth meshes; and therefore, by this connection, the positions of the beam elements with respect to the cloth meshes are set.

The seam allowance folding setting unit 17 folds seam allowances by applying loads in opposite directions respectively to the stitching lines and to outer edges on sides of the stitching lines. In this embodiment, seam allowances are folded; thereby, stiffness of the first cloth and the second cloth when sewing is actually performed can be accurately analyzed.

Figure 3:
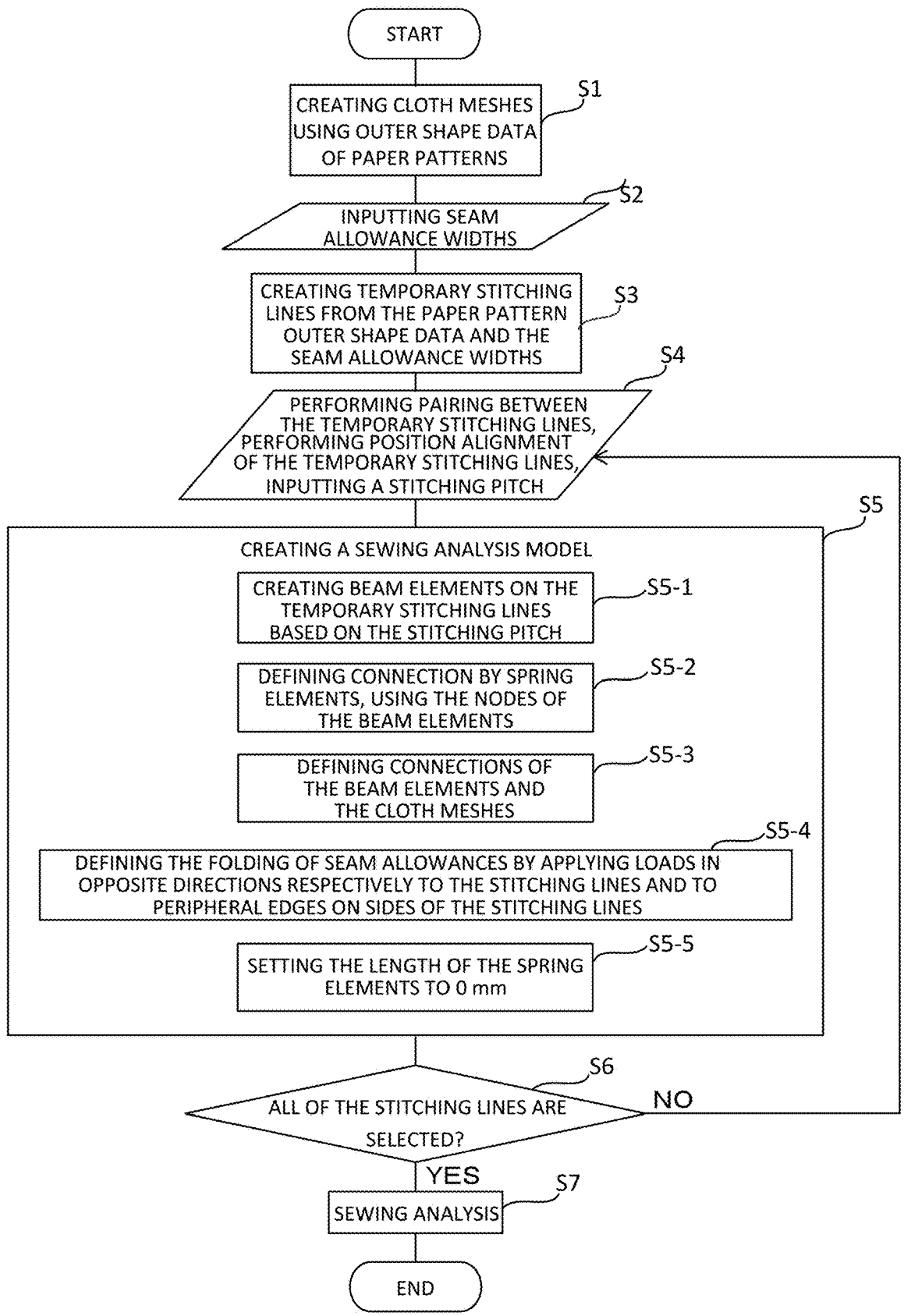
FIG. 3 is a flowchart showing the operation of the sewing analysis system.

Next, the operation in the sewing analysis system 100 of this embodiment will be described with reference to drawings. FIG. 3 is a flowchart showing the operation in the sewing analysis system 100 of this embodiment.

Figure 4:
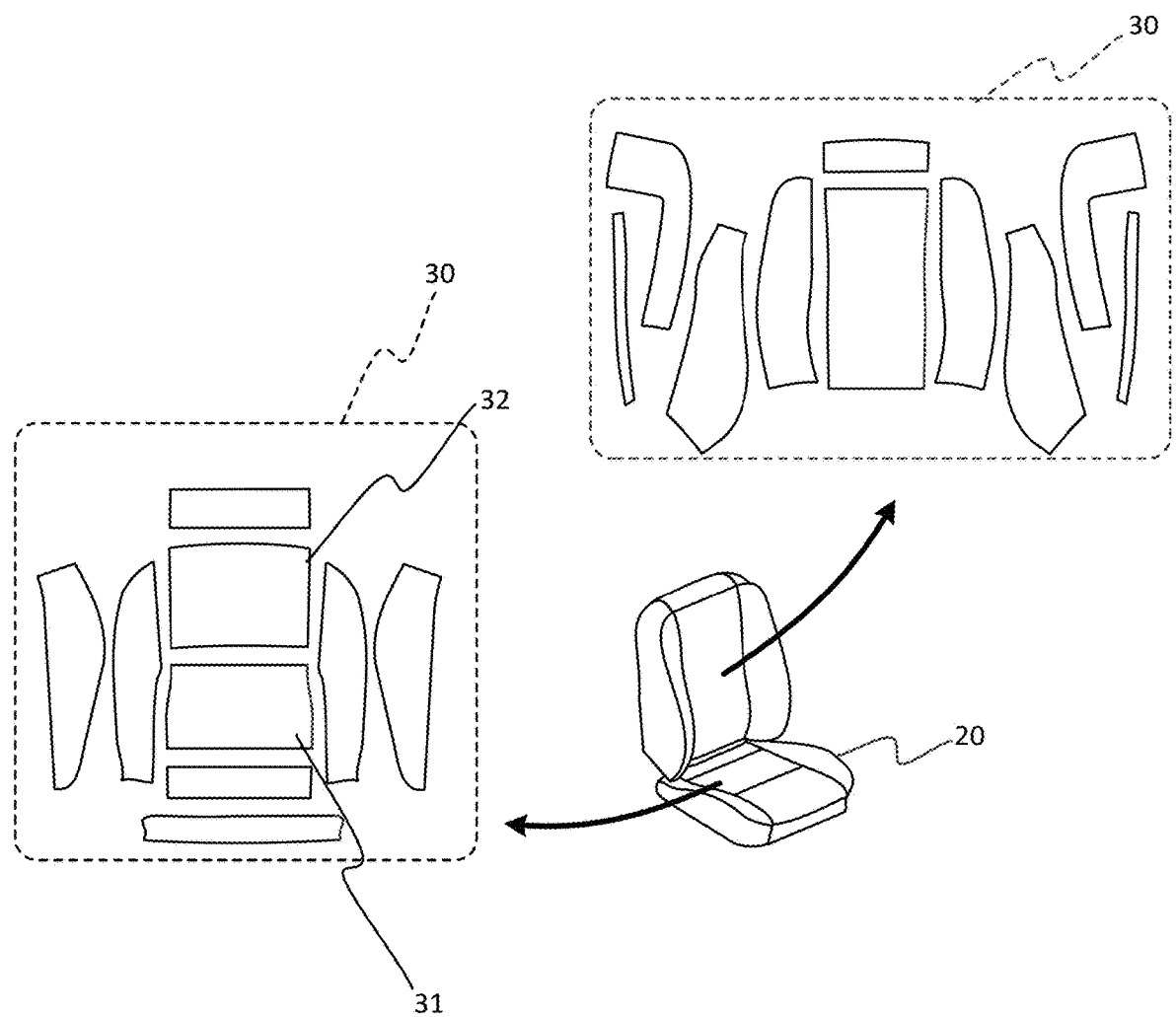
FIG. 4 is a view for explaining one example of the outer shape data of paper patterns used in the sewing analysis system.

First, the cloth mesh creation unit 12 creates cloth meshes using the outer shape data of paper patterns (FIG. 3: S1). In this embodiment, a developed shape is calculated from three-dimensional design data to create the outer shape data of paper patterns. FIG. 4 is a view for explaining one example of the outer shape data of paper patterns. As shown in FIG. 4, for example, design data 20 of a seat used for vehicles is created as three-dimensional design data; a developed shape is calculated from the design data 20 of this seat; and two-dimensional paper pattern outer shape data 30 for sewing a seat trim is created. In the example in FIG. 4, the paper pattern outer shape data 30 for the seat trim is created from each of a backrest part and a seat surface part. Paper patterns used in actual sewing are created based on this paper pattern outer shape data 30. Processing for creating the design data 20 of the seat and processing for creating the paper pattern outer shape data 30 are executed independently of processing of the sewing analysis system 100 of the embodiment shown in FIG. 3.

In the description below, as one example, first paper pattern outer shape data 31 and second paper pattern outer shape data 32 of the paper pattern outer shape data 30 for the seat surface part shown in FIG. 4 are used.

Figure 5A:
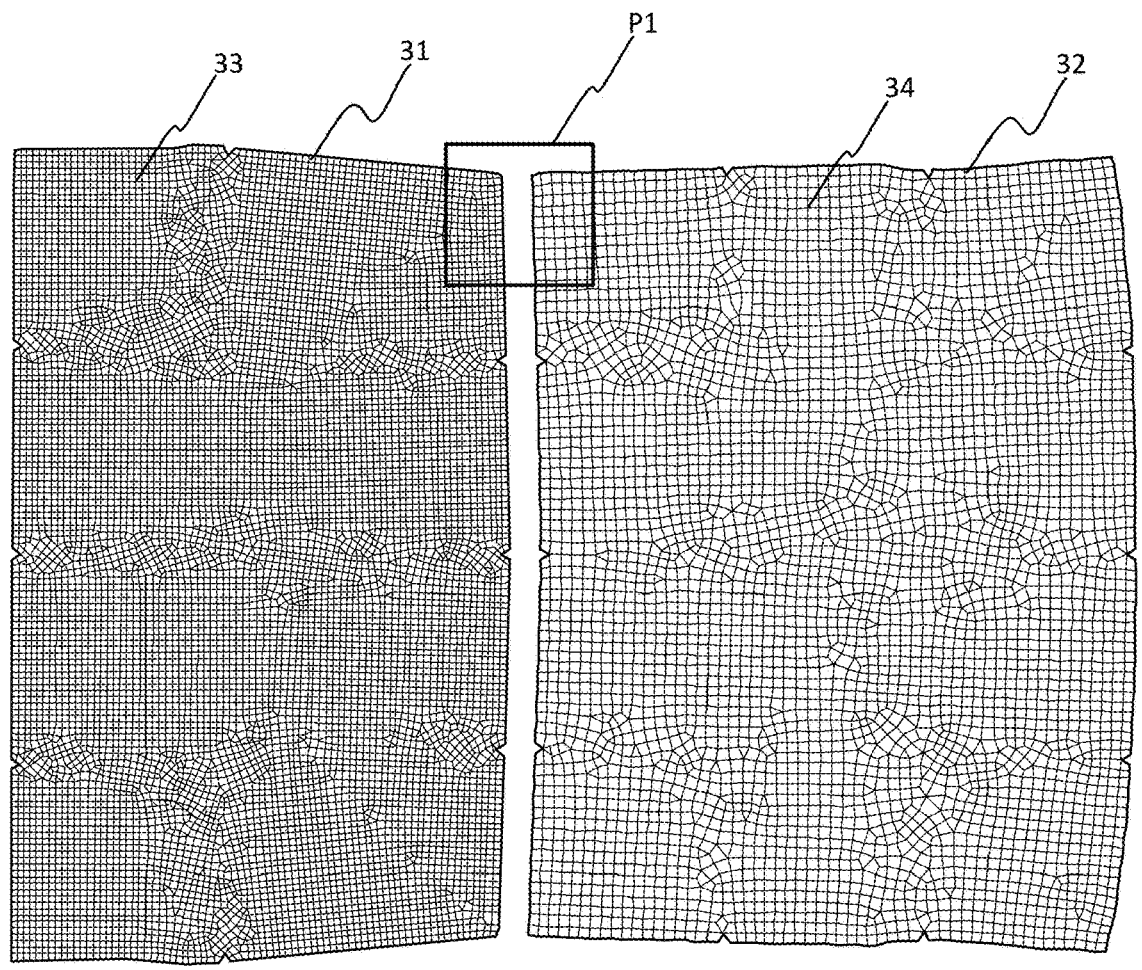
FIG. 5A is a view showing examples of cloth meshes created on the paper pattern outer shape data.
Figure 5B:
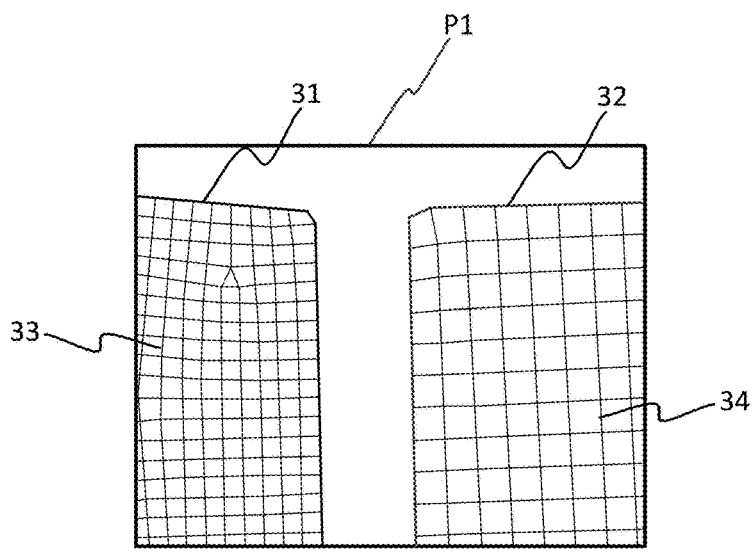
FIG. 5B is an enlarged view of a part of FIG. 5A.

The cloth mesh is an element used for analysis by the finite element method and is a mesh of a polygonal shape such as a triangle, square, or the like. It should be noted that the method used for analysis is not limited to the finite element method, but it may be another method. In FIG. 5A and FIG. 5B, examples of the cloth mesh are shown. FIG. 5A is a view showing the examples of cloth meshes which are created on the first paper pattern outer shape data 31 and the second paper pattern outer shape data 32. FIG. 5B is an enlarged view of a part P1 in FIG. 5A.

As shown in FIG. 5A and FIG. 5B, a cloth mesh 33 is created on the first paper pattern outer shape data 31 and a cloth mesh 34 is created on the second paper pattern outer shape data 32. The cloth meshes 33 and 34 are created so that paper patterns represented by the first paper pattern outer shape data 31 and second paper pattern outer shape data 32 are faithfully reproduced. In addition, the mesh sizes of the cloth meshes 33 and 34 are specified in advance by a program so that analysis accuracy can be ensured.

Figure 6A:
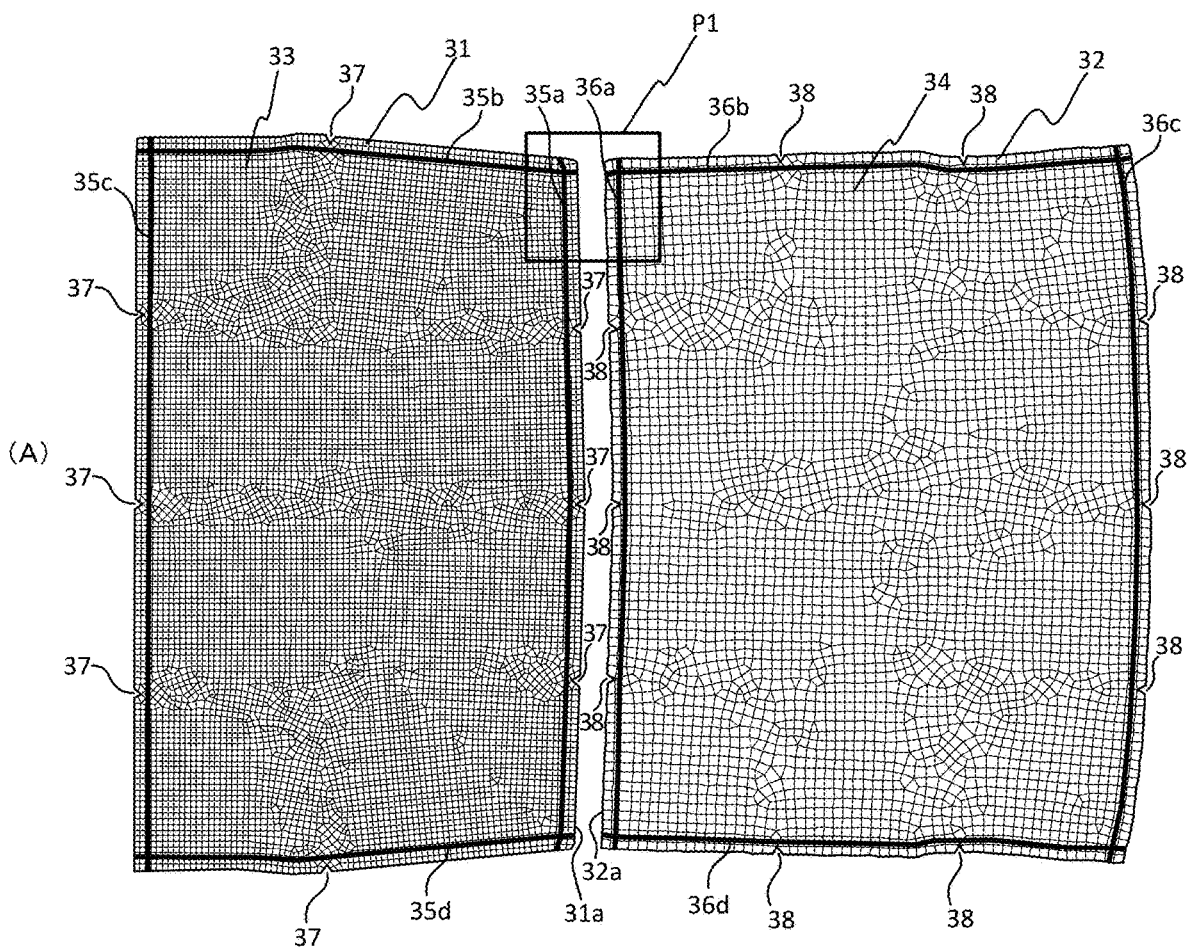
FIG. 6A is a view showing seam allowance widths and stitching lines.
Figure 6B:
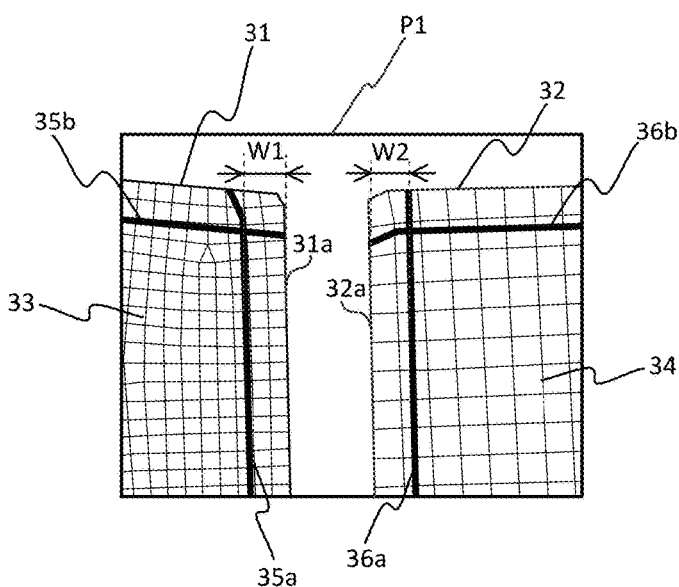
FIG. 6B is an enlarged view of a part of FIG. 6A.

Next, seam allowance widths are input by a user (FIG. 3: S2). FIG. 6A is a view showing seam allowance widths and stitching lines. FIG. 6B is an enlarged view of a part P1 in FIG. 6A. The seam allowance widths are, as shown in FIG. 6B, input as a width from a peripheral edge 31a of the first paper pattern outer shape data 31 and a width from a peripheral edge 32a of the second paper pattern outer shape data 32. In the example shown in FIG. 6B, the seam allowance width of a width W1 is input for the first paper pattern outer shape data 31 and the seam allowance width of a width W2 is input for the second paper pattern outer shape data 32. The seam allowance widths are input so as to be applied to all peripheral edges of the first paper pattern outer shape data 31 and the second paper pattern outer shape data 32.

The temporary stitching line creation unit 13 creates temporary stitching lines from the paper pattern outer shape data and the seam allowance widths (FIG. 3: S3). In the examples shown in FIG. 6A and FIG. 6B, temporary stitching lines 36a, 36b, 36c, and 36d are created on the first paper pattern outer shape data 31, and temporary stitching lines 37a, 37b, 37c, and 37d are created on the second paper pattern outer shape data 32. The created temporary stitching lines 36a, 36b, 36c, and 36d and temporary stitching lines 37a, 37b, 37c, and 37d are displayed on the display device 2 and can be visually checked by a user.

The user specifies temporary stitching lines, which are to be sewn together, from among the temporary stitching lines displayed on the display device 2 and performs pairing between the temporary stitching lines (FIG. 3: S4). In the example shown in FIG. 6A, pairing is performed between the temporary stitching line 36a and temporary stitching line 37a respectively corresponding to the peripheral edge 31a and peripheral edge 32a on the side where the first paper pattern outer shape data 31 and the second paper pattern outer shape data 32 faces each other.

Next, the user performs position alignment of the temporary stitching lines (FIG. 3: S4). As shown in FIG. 6A, a v-shaped concave part 37 for position alignment is formed at a plurality of positions on the first paper pattern outer shape data 31, and a v-shaped concave part 38 for position alignment is formed at a plurality of positions on the second paper pattern outer shape data 32. These v-shaped concave parts 37 and 38 for position alignment are also used for position alignment of paper patterns in actual sewing.

Figure 7:
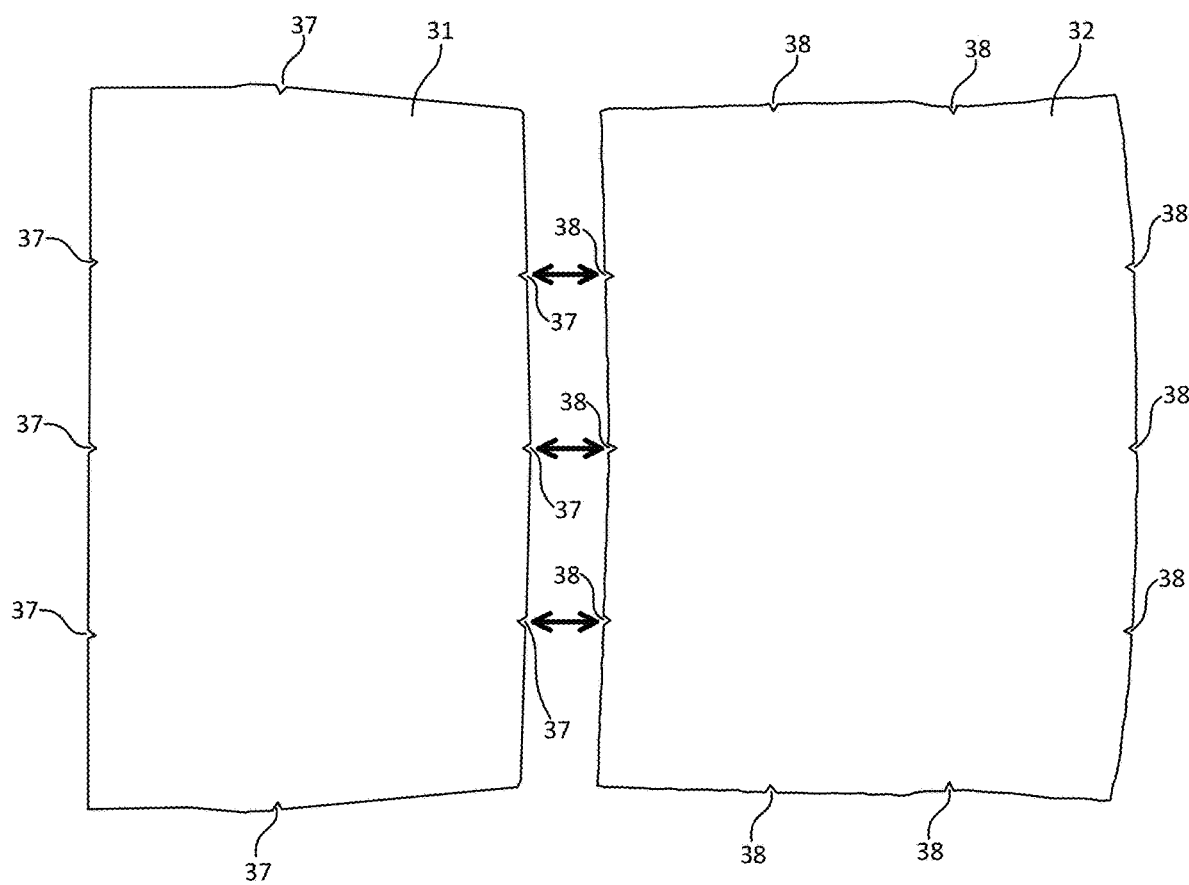
FIG. 7 is a view for explaining the position alignment of temporary stitching lines.

FIG. 7 is a view for explaining the position alignment of the temporary stitching lines. It should be noted that in FIG. 7, display of the cloth meshes and temporary stitching lines is omitted for easy understanding. In the example shown in FIG. 7, the user performs position alignment so that the positions of the v-shaped concave parts 37 and 38 for position alignment which are indicated by bidirectional arrows match with each other.

Next, the user inputs a stitching pitch (FIG. 3: S4). In the sewing analysis system 100 of this embodiment, the stitching pitch can be freely input irrespective of the number of divisions of a cloth mesh. Since, in an actual sewing operation, the stitching pitch changes according to the feeding speed of a sewing machine, enabling the stitching pitch to be freely input as in this embodiment allows representation of the same stitching pitch as that for an actual product.

When input of the stitching pitch by the user is complete, processing for creating a sewing analysis model is executed by the beam element creation unit 14, the spring element connection unit 15, and the beam element connection unit 16 (FIG. 3: S5).

Figure 8A:
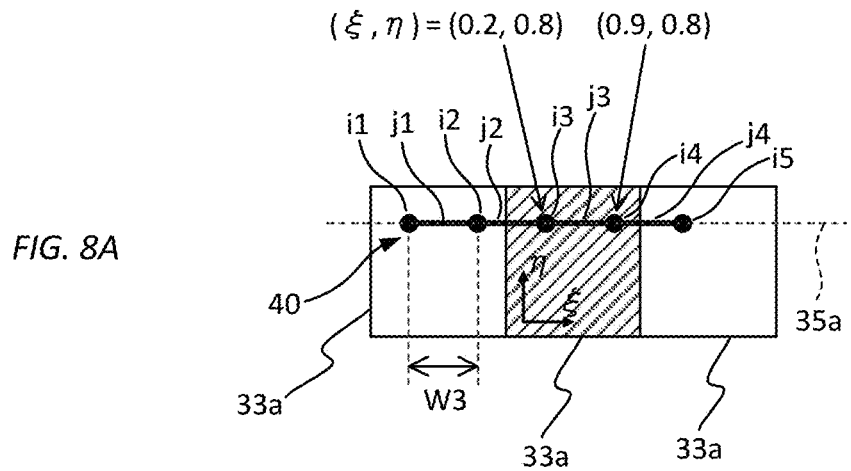
FIG. 8A is a view showing an initial state in which the coordinates of nodes of a beam element are represented by normalized coordinates.
Figure 8B:
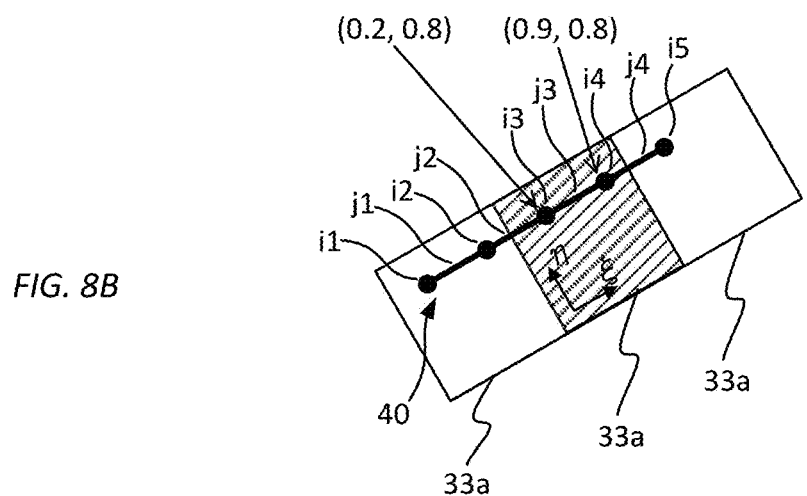
FIG. 8B is a view showing a state in which a shell element has moved or rotated from the initial state shown in FIG. 8A.
Figure 8C:
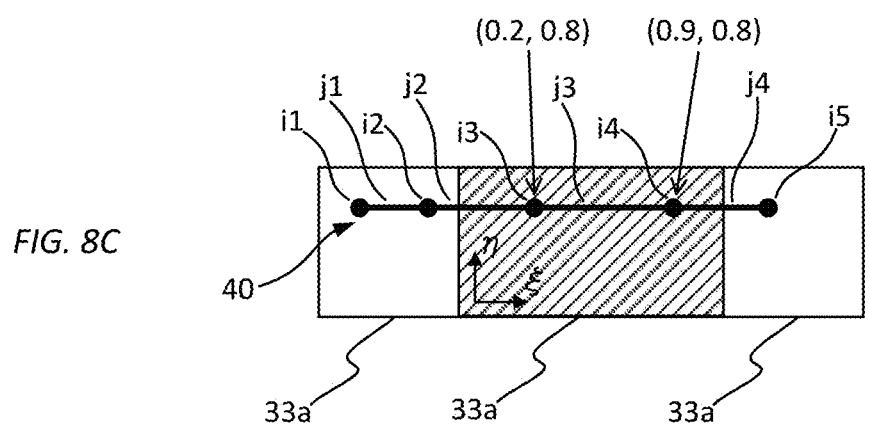
FIG. 8C is a view showing a state in which the shell element has been deformed from the initial state shown in FIG. 8A.

The beam element creation unit 14 creates beam elements on the temporary stitching lines based on the stitching pitch (FIG. 3: S5-1). FIG. 8A, FIG. 8B, and FIG. 8C are views for explaining a beam element in this embodiment. In FIG. 8A, FIG. 8B, and FIG. 8C, a part of the cloth mesh 33 created on the first paper pattern outer shape data 31 is shown as one example. In the description below, square elements constituting the cloth mesh 33 are referred to as shell elements 33a. In FIG. 8A, FIG. 8B, and FIG. 8C, three shell elements 33a are shown.

As described above, in the vicinity of the peripheral edge on the side where position alignment of the first paper pattern outer shape data 31 has been made, the temporary stitching line 35a is formed in accordance with the seam allowance width. The beam element is created on this temporary stitching line 35a in accordance with the stitching pitch. As shown in FIG. 8A, a beam element 40 of this embodiment is constituted of nodes i1, i2, i3, i4, i5, . . . and beam parts j1, j2, j3, j4, . . . . The nodes i1, i2, i3, i4, i5, . . . correspond to points for sewing. Accordingly, the interval between the nodes corresponds to the stitching pitch and in the example shown in FIG. 8A, the interval between the node i1 and the node i2 is a stitching pitch W3. In addition, the beam element 40 indicates a stitching line.

The spring element connection unit 15 defines connection by spring elements, using the nodes of the beam elements (FIG. 3: S5-2). FIG. 9A is a view for explaining connection by the spring elements. FIG. 9B is an enlarged view of a part P2 in FIG. 9A. In FIG. 9A and FIG. 9B, both ends of spring elements 50 are connected to the nodes of the beam elements 40. The spring elements 50 are elements used for implementing the connection of the stitching lines indicated by the beam elements 40. In this embodiment, as one example, the length of the spring elements 50 is set to 10 mm, the spring stiffness thereof is set to 2 N/mm, and an initial tension thereof is set to 20 N, in an initial state shown in FIG. 9A and FIG. 9B. The initial tension is set to such a value that the tension is ON when the length of the spring elements 50 is 0 mm.

In this embodiment, as described above, nodes on the cloth meshes (vertexes of shell elements) are not used for connection of the stitching lines indicated by the beam elements 40 and therefore, the stitching pitch can be specified independently of the sizes of the cloth meshes. FIG. 10A and FIG. 10B are views showing connection by the spring elements 50 in cases where different stitching pitches are specified. FIG. 10A shows the case where the stitching pitch is specified to be 10 mm, and FIG. 10B shows the case where the stitching pitch is specified to be 28 mm. Thus, in this embodiment, the nodes of the beam elements 40 are used for connection of the stitching lines by the spring elements 50 without using the nodes on the cloth meshes and therefore, the stitching pitch can be changed on one of the stitching lines. Consequently, the state of a product after actual sewing can be faithfully reflected on a sewing analysis model, thereby enabling a highly accurate analysis.

The beam element connection unit 16 defines connections of the beam elements and the cloth meshes (FIG. 3: S5-3). In this embodiment, coordinates that are normalized for each of the shell elements constituting the cloth meshes are set and the coordinates of nodes of the beam elements are indicated on the normalized coordinates, thereby defining the connection of the beam elements and the cloth meshes. For example, in FIG. 8A, FIG. 8B, and FIG. 8C, normalized ξη coordinates are set in a hatched shell element 33a, in which the coordinates of the node i3 of the beam element 40 are indicated as (0.2, 0.8) and the coordinates of the node i4 are indicated as (0.9, 0.8).

Thus, in this embodiment, the coordinate values of nodes of a beam element are set on coordinates that are normalized for each shell element and therefore, even when a shell element has moved or rotated, or has been deformed, the coordinate values of the nodes of the beam element do not change. For example, FIG. 8A shows an initial state in which the coordinates of the nodes of the beam element are indicated by the ξη coordinates. FIG. 8B shows a state in which the shell element has moved or rotated from the initial state shown in FIG. 8A by performing sewing analysis. As shown in FIG. 8B, even when the shell element has moved or rotated, the coordinates of the node i3 of the beam element 40 are (0.2, 0.8) and the coordinates of the node i4 are (0.9, 0.8). In addition, FIG. 8C shows a state in which the shell element has deformed from the initial state shown in FIG. 8A by performing sewing analysis. As shown in FIG. 8C, even when the shell element has deformed, the coordinates of the node i3 of the beam element 40 are (0.2, 0.8) and the coordinates of the node i4 are (0.9, 0.8).

As described above, in this embodiment, the coordinates of the nodes of a beam element are indicated on coordinates which are normalized for each shell element and thereby, the nodes of the beam element on a stitching line are connected to shell elements constituting a cloth mesh so that an initial geometric positional relationship on the shell elements is maintained during sewing analysis. Consequently, the state of a product after actual sewing can be faithfully reflected on a sewing analysis model, thereby enabling a highly accurate analysis.

Figure 11:
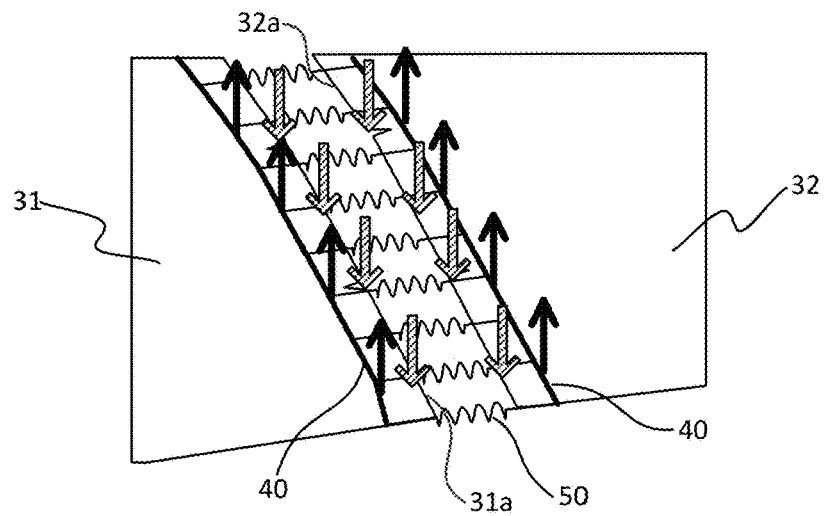
FIG. 11 is a schematic view of a state in which loads in opposite directions are respectively applied to the stitching lines and to peripheral edges on sides of the stitching lines of the paper pattern outer shape data.

The seam allowance folding setting unit 17 defines the folding of seam allowances by applying loads in opposite directions respectively to the stitching lines indicated by the beam elements and to peripheral edges on sides of the stitching lines of the paper pattern outer shape data (FIG. 3: S5-4). FIG. 11 is a schematic view of a state in which loads in opposite directions are respectively applied to the stitching lines and to peripheral edges on sides of the stitching lines of the paper pattern outer shape data. In the example shown in FIG. 11, an upward load is applied to a stitching line indicated by the beam element 40 of the first paper pattern outer shape data 31, as indicated by black arrows. In addition, as shown in FIG. 11, a downward load is applied to the peripheral edge 31a on the stitching line side of the first paper pattern outer shape data 31, as indicated by hatched arrows. Similarly, as shown in FIG. 11, an upward load is applied to the stitching line indicated by the beam element 40 of the second paper pattern outer shape data 32, as indicated by black arrows. Further, as shown in FIG. 11, a downward load is applied to the peripheral edge 32a on the stitching line side of the second paper pattern outer shape data 32, as indicated by hatched arrows.

Figure 12A:
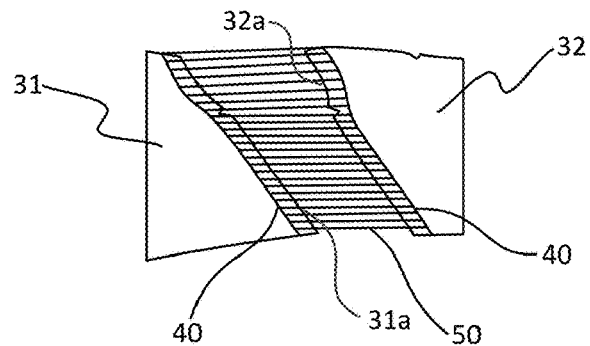
FIG. 12A, FIG. 12B, and FIG. 12C are views explaining a process from connection by spring elements to the completion of sewing.
Figure 12B:
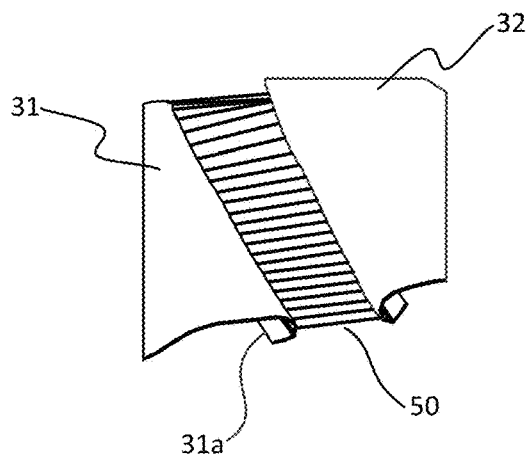
Figure 12C:
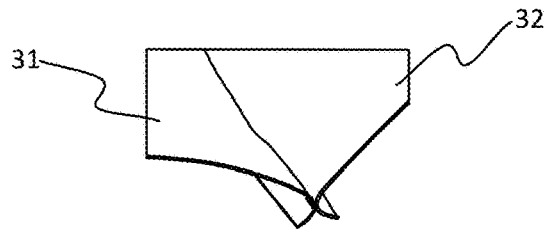

FIG. 12A, FIG. 12B, and FIG. 12C are views explaining a process from connection by spring elements to the completion of sewing. In FIG. 12A and FIG. 12B, the spring elements 50 are indicated by straight lines. As shown in FIG. 12A, the connection of the stitching line of the first paper pattern outer shape data 31 and the stitching line of the second paper pattern outer shape data 32 are defined by the spring elements 50 and then, the folding of the seam allowances is defined as described above. As a result, as shown in FIG. 12B, a sewing analysis model in which the seam allowances have been folded can be obtained.

Thus, in this embodiment, loads in opposite directions are respectively applied to the stitching lines and to the peripheral edges on sides of the stitching lines of the paper pattern outer shape data, thereby folding the seam allowances; and therefore, a change in stiffness of paper patterns due to the folding of the seam allowances can be faithfully reflected on a sewing analysis model, enabling a highly accurate analysis.

The spring element connection unit 15 sets the length of the spring elements to 0 mm (FIG. 3: S5-5). FIG. 12C shows a state in which the length of the spring elements 50 is set to 0 mm after the state shown in FIG. 12B. Thus, according to this embodiment, the state of a product after actual sewing in which the stitching lines are sewn together and then the seam allowances are folded can be faithfully reflected on a sewing analysis model, thereby enabling a highly accurate analysis.

The control unit 10 selects, when the above described processing for creating a sewing analysis model ends (FIG. 3: S5), all of the stitching lines; and determines whether the processing for creating a sewing analysis model is complete (FIG. 3: S6). The control unit 10 returns, when determining that unprocessed stitching lines are left (FIG. 3: S6; NO), to step S4 and performs the above processing. On the other hand, the control unit 10 ends, when determining that the processing for creating a sewing analysis model for all of the stitching lines is complete (FIG. 3: S6; YES), the processing for creating a sewing analysis model (FIG. 3: S5).

The control unit 10 performs sewing analysis (simulation) after ending the processing for creating a sewing analysis model (FIG. 3: S7). The sewing analysis includes, for example, in the case of this embodiment, a seat covering analysis for analyzing whether seat covering is possible while a seat trim is kept from being wrinkled, etc. In addition, other examples of the sewing analysis include a seat cushion stiffness evaluation in which a reaction force from a seat according to the presence/absence of a covering stress by a seat trim is analyzed. In addition, a comfort evaluation (body pressure distribution) or a comfort evaluation (random vibration response) is included in the other examples of the sewing analysis.

As described above, according to this embodiment, a sewing analysis can be performed using the same information as for a sewing process of an actual product, the information including: paper pattern outer shape data allowing for seam allowance widths and including V-shape concave parts for position alignment; a stitching pitch and stitching lines independent of cloth meshes; and the folding of seam allowances. Consequently, a highly accurate sewing analysis can be performed.

Especially, according to this embodiment, an actual paper pattern shape in which seam allowance widths are allowed for is used and in addition, the folding of seam allowances can be reflected on a sewing analysis model; and therefore, a change in stiffness due to the folding of the seam allowances can be highly accurately represented with the sewing analysis model.

In addition, according to this embodiment, the stitching lines and the cloth meshes are independently handled and therefore, the stitching pitch can be changed while the analysis accuracy of cloth is maintained. Thus, a model of an actual stitching pitch can be formed, thereby enabling a highly accurate product strength evaluation after sewing.

Modified Example

The above embodiment is provided by way of example and various modifications may be made without departing from the scope of the invention. In the embodiment described above, as an example, the present invention is applied to the creation of a sewing analysis model of a vehicle seat trim and to a sewing analysis thereof. However, the present invention is not limited to such aspects; but is also applicable to the creation of a sewing analysis model of a general product involving sewing, for example, fabric for clothes and to a sewing analysis thereof.

In addition, the sewing analysis using a sewing analysis model according to the present invention is further applicable to an examination of influences of variations of a stitching pitch in an actual sewing process or an examination of product characteristics in consideration of influences of a sewing process.

The program of the sewing analysis system according to the above aspects can be installed into a computer by being provided in the form of being stored in a computer-readable recording medium. The storage medium is, for example, a non-transitory recording medium and a preferred example is an optical recording medium such as a CD-ROM; however, it can include a publicly known recording medium of any format such as a semiconductor recording medium and a magnetic recording medium. Alternatively, the above program can be installed into a computer by being provided in the form of being distributed via a communication network.

The sewing analysis system according to this embodiment of the present invention and the program of the sewing analysis system have been described above; however, the present invention is not limited to this and various modifications may be made without departing from the scope and spirit of the present invention.

As is described above, one aspect of the sewing analysis system of the present disclosure is a sewing analysis system for performing a simulation of a sewing process based on a flat paper pattern outer shape, which comprises: a sewing instruction unit for providing an instruction on an alignment position of first cloth and second cloth, seam allowance widths, and a stitching pitch based on paper patter outer shape data; a cloth mesh creation unit for creating a cloth mesh on each of the first cloth and the second cloth based on the paper pattern outer shape data; a temporary stitching line creation unit for creating a temporary stitching line on each of the first cloth and the second cloth based on the paper pattern outer shape data and the seam allowance widths; a beam element creation unit for creating a beam element forming a stitching line on the temporary stitching line based on the stitching pitch; a spring element connection unit for connecting the beam element of the first cloth and the beam element of the second cloth by spring elements; a beam element connection unit for connecting the beam elements and the cloth meshes; and a seam allowance folding setting unit for folding seam allowances by applying loads in opposite directions respectively to the stitching lines and to peripheral edges on sides of the stitching lines of the first cloth and the second cloth.

In this specification, "cloth" is a concept including fabric, leather, or synthetic resin, etc. that is used as a material of a three-dimensional structure.

According to the present disclosure, the sewing instruction unit provides an instruction on an alignment position of first cloth and second cloth, seam allowance widths, and a stitching pitch based on paper pattern outer shape data. The cloth mesh creation unit creates a cloth mesh on each of the first cloth and the second cloth based on the paper pattern outer shape data. The temporary stitching line creation unit creates a temporary stitching line on each of the first cloth and the second cloth based on the paper pattern outer shape data and the seam allowance widths. The beam element creation unit creates a beam element forming a stitching line on the temporary stitching line based on the stitching pitch. The spring element connection unit connects the beam element of the first cloth and the beam element of the second cloth by spring elements. The beam element connection unit connects the beam elements and the cloth meshes. The seam allowance folding setting unit folds seam allowances by applying loads in opposite directions respectively to the stitching lines and to peripheral edges on sides of the stitching lines of the first cloth and the second cloth. Thus, in the present disclosure, a sewing analysis model is created using the same information, including seam allowance widths, a stitching pitch, and the folding of a seam allowance, as for an actual sewing process; and therefore, a sewing simulation for an evaluation of the completed state of a three-dimensional structure, an evaluation of stiffness, or the like can be accurately performed. In addition, in the present disclosure, an actual paper pattern shape including a seam allowance can be used; and therefore, a change in stiffness due to the folding of the seam allowance can be precisely represented. In addition, in the present disclosure, the stitching lines and the cloth meshes can be independently handled; and therefore, the stitching pitch can be changed while the accuracy of cloth analysis is maintained. As a result, an analysis of strength, etc. according to differences in the stitching pitch can be accurately performed.

In another aspect of the sewing analysis system of the present disclosure, the beam element creation unit may create the beam elements independently of nodes of the cloth meshes. According to this aspect, a beam element forming a stitching line according to a stitching pitch is created independently of nodes of a cloth mesh. Therefore, the stitching pitch can be changed while the accuracy of cloth analysis with the cloth mesh is maintained. As a result, an analysis of strength, etc. according to differences in the stitching pitch can be accurately performed.

In another aspect of the sewing analysis system of the present disclosure, the sewing instruction unit may be able to provide an instruction on the stitching pitch independently of the sizes of the cloth meshes. According to this aspect, an instruction on a stitching pitch can be provided independently of the size of a cloth mesh and therefore, the stitching pitch can be changed while the accuracy of cloth analysis with the cloth mesh is maintained. As a result, an analysis of strength, etc. according to differences in the stitching pitch can be accurately performed.

In another aspect of the sewing analysis system of the present disclosure, the sewing instruction unit may be able to change the stitching pitch on one of the stitching lines. According to this aspect, a stitching pitch can be changed on a stitching line and therefore, an analysis of strength, etc. in a case where the stitching pitch is changed on an identical stitching line can be accurately performed.

In another aspect of the sewing analysis system of the present disclosure, nodes of the beam elements on the stitching lines may be set so that their coordinate values on normalized coordinates in shell elements of the cloth meshes do not change even when the positions or sizes of the cloth meshes change. According to this aspect, even when the position or size of a cloth mesh changes, the coordinate values of nodes of a beam element do not change on normalized coordinates of shell elements of the cloth mesh and therefore, a sewing simulation for an evaluation of the completed state of a three-dimensional structure, an evaluation of stiffness, or the like can be accurately performed.

One aspect of the non-transitory computer-readable computer medium having instructions stored therein, which, when executed by a computer, cause the computer to perform operations for a simulation of a sewing process based on a flat paper pattern outer shape, of the present disclosure, the operations comprising: providing an instruction on an alignment position of first cloth and second cloth, seam allowance widths, and a stitching pitch, based on paper pattern outer shape data; creating a cloth mesh on each of the first cloth and the second cloth based on the paper pattern outer shape data; creating a temporary stitching line on each of the first cloth and the second cloth based on the paper pattern outer shape data and the seam allowance widths; creating a beam element forming a stitching line on the temporary stitching line based on the stitching pitch; connecting the beam element of the first cloth and the beam element of the second cloth by spring elements; connecting the beam elements and the cloth meshes; and folding seam allowances by applying loads in opposite directions respectively to the stitching lines and to peripheral edges on sides of the stitching lines of the first cloth and the second cloth.

According to the aspect of the non-transitory computer-readable computer medium of the present disclosure, the computer performs as follows: The computer as the sewing instruction unit provides an instruction on an alignment position of first cloth and second cloth, seam allowance widths, and a stitching pitch, based on paper pattern outer shape data. The computer as the cloth mesh creation unit creates a cloth mesh on each of the first cloth and the second cloth based on the paper pattern outer shape data. The computer as the temporary stitching line creation unit creates a temporary stitching line on each of the first cloth and the second cloth based on the paper pattern outer shape data and the seam allowance widths. The computer as the beam element creation unit creates a beam element forming a stitching line on the temporary stitching line based on the stitching pitch. The computer as the spring element connection unit connects the beam element of the first cloth and the beam element of the second cloth by spring elements. The computer as the beam element connection unit connects the beam elements and the cloth meshes. The computer as the seam allowance folding setting unit folds seam allowances by applying loads in opposite directions respectively to the stitching lines and to peripheral edges on sides of the stitching lines of the first cloth and the second cloth. Thus, in the present disclosure, a sewing analysis model is created using the same information, including seam allowance widths, a stitching pitch, and the folding of seam allowances, as for an actual sewing process; and therefore, a sewing simulation for an evaluation of the completed state of a three-dimensional structure, an evaluation of stiffness, or the like can be accurately performed. In addition, in the present invention, an actual paper pattern shape including a seam allowance can be used; and therefore, a change in stiffness due to the folding of the seam allowance can be precisely represented. In addition, in the present invention, the stitching lines and the cloth meshes can be independently handled; and therefore, the stitching pitch can be changed while the accuracy of cloth analysis is maintained. As a result, an analysis of strength, etc. according to differences in the stitching pitch can be accurately performed.

According to the present disclosure, a change in stiffness of the cloth around the stitching line due to the folding of seam allowances can be represented. Therefore, the stitching pitch can be changed while the accuracy of the cloth meshes is maintained.

The present disclosure is applicable to the field of designing a flat paper pattern shape for products such as a vehicle seat trim, etc. which use textiles and leather.

The invention claimed is:

1. A sewing analysis system for performing a simulation of a sewing process based on a flat paper pattern outer shape, comprising:
a display;
memory storing computer-readable instructions; and
one or more processors configured to execute the computer-readable instructions such that the one or more processors are configured to perform operations including,
receiving design data of an object to be covered by a material and paper pattern outer shape data corresponding to the design data;
providing an instruction on an alignment position of first cloth and second cloth, seam allowance widths, and a stitching pitch based on the paper pattern outer shape data;
creating and displaying a cloth mesh on each of the first cloth and the second cloth based on the paper pattern outer shape data;
creating and displaying a temporary stitching line on each of the first cloth and the second cloth based on the paper pattern outer shape data and the seam allowance widths;
creating a beam element forming a stitching line on the temporary stitching line based on the stitching pitch;
connecting the beam element of the first cloth and the beam element of the second cloth by spring elements shown on the display;
connecting the beam elements and the cloth meshes; and
folding and displaying seam allowances by applying loads in opposite directions respectively to the stitching lines and to peripheral edges on sides of the stitching lines of the first cloth and the second cloth.

2. The sewing analysis system according to claim 1, wherein
the one or more processors create the beam elements independently of nodes of the cloth meshes.

3. The sewing analysis system according to claim 1, wherein the one or more processors
are configured to provide an instruction on the stitching pitch independently of sizes of the cloth meshes.

4. The sewing analysis system according to claim 1, wherein the one or more processors are configured to change the stitching pitch on one of the stitching lines.

5. The sewing analysis system according to claim 1, wherein
nodes of the beam elements are set so that coordinate values thereof on normalized coordinates in shell elements of the cloth meshes do not change even when the positions or sizes of the cloth meshes change.

6. A non-transitory computer-readable computer medium having instructions stored therein, which, when executed by a computer, cause the computer to perform operations for a simulation of a sewing process based on a flat paper pattern outer shape, the operations comprising:
receiving design data of an object to be covered by a material and paper pattern outer shape data corresponding to the design data;
providing an instruction on an alignment position of first cloth and second cloth, seam allowance widths, and a stitching pitch, based on the paper pattern outer shape data;

creating and displaying a cloth mesh on each of the first cloth and the second cloth based on the paper pattern outer shape data;
creating and displaying a temporary stitching line on each of the first cloth and the second cloth based on the paper pattern outer shape data and the seam allowance widths;
creating a beam element forming a stitching line on the temporary stitching line based on the stitching pitch;
connecting the beam element of the first cloth and the beam element of the second cloth by displayed spring elements;
connecting the beam elements and the cloth meshes; and
folding and displaying seam allowances by applying loads in opposite directions respectively to the stitching lines and to peripheral edges on sides of the stitching lines of the first cloth and the second cloth.

\* \* \* \* \*